United States Patent
Baek et al.

(10) Patent No.: US 8,846,222 B2
(45) Date of Patent: Sep. 30, 2014

(54) BATTERY PACK

(75) Inventors: Woonseong Baek, Yongin-si (KR); Jeongdeok Byun, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 203 days.

(21) Appl. No.: 12/908,646

(22) Filed: Oct. 20, 2010

(65) Prior Publication Data

US 2011/0151284 A1 Jun. 23, 2011

(30) Foreign Application Priority Data

Dec. 18, 2009 (KR) ........................ 10-2009-0126982

(51) Int. Cl.
- H01M 14/00 (2006.01)
- H01M 2/10 (2006.01)
- H01M 2/02 (2006.01)
- H01M 10/42 (2006.01)

(52) U.S. Cl.
CPC .............. *H01M 2/0267* (2013.01); *Y02E 60/12* (2013.01); *H01M 2/0207* (2013.01); *H01M 10/4235* (2013.01); *H01M 2/1022* (2013.01)
USPC .............. 429/7; 429/100; 429/159; 429/163; 429/162; 429/175; 429/185

(58) Field of Classification Search
CPC .............................. H04M 1/026; H01M 10/44
USPC .............. 429/7, 163, 162, 175, 100, 159, 185
See application file for complete search history.

(56) References Cited

U.S. PATENT DOCUMENTS

| 2006/0176014 A1* | 8/2006 | Moon ........................... 320/112 |
| 2008/0241654 A1* | 10/2008 | Koh et al. ..................... 429/100 |
| 2009/0081539 A1* | 3/2009 | Koh et al. ..................... 429/178 |
| 2010/0040942 A1* | 2/2010 | Hatta et al. .................... 429/163 |
| 2011/0039129 A1* | 2/2011 | Lee et al. ........................... 429/7 |

FOREIGN PATENT DOCUMENTS

| KR | 10-2006-0086023 A | 7/2006 |
| KR | 10-2008-0078002 A | 8/2008 |
| KR | 10-2009-0004355 A | 1/2009 |
| KR | 20090031159 A | 3/2009 |
| WO | WO/2007/072736 | * 6/2007 |
| WO | WO 2009/078580 | * 6/2009 |

OTHER PUBLICATIONS

KR 10 2009-0004355 (machine translation).*

* cited by examiner

*Primary Examiner* — Patrick Ryan
*Assistant Examiner* — Alex Usyatinsky
(74) *Attorney, Agent, or Firm* — Knobbe Martens Olson & Bear LLP

(57) ABSTRACT

A battery pack including a reinforcement plate having a metal layer and a heat sealing layer, wherein the reinforcement plate is attached to a battery cell to reinforce the battery cell, thus improving reliability regarding product quality. The battery pack includes a battery cell, a circuit module electrically connected to the battery cell, a top cover installed on an upper portion of the battery cell, and a reinforcement plate attached to the battery cell.

17 Claims, 8 Drawing Sheets

BATTERY PACK

CROSS-REFERENCE TO RELATED APPLICATIONS

This application claims the benefit of Korean Patent Application No. 10-2009-0126982, filed Dec. 18, 2009, in the Korean Intellectual Property Office, the disclosure of which is incorporated herein by reference.

BACKGROUND

1. Field

Embodiments relate to a battery pack.

2. Description of the Related Technology

Lithium secondary batteries may have battery pack structures, including a battery cell, a circuit module, an outer cover, and a reinforcement plate. The battery cell includes an electrode assembly, a case, and a cap assembly. The electrode assembly includes a positive electrode plate, a negative electrode plate, and a separator. The case accommodates the electrode assembly. The cap assembly seals a top opening of the case. The circuit module includes a circuit device, such as a charge/discharge device, and a protective circuit device and is coupled to a bare cell. The outer cover covers the circuit module. The reinforcement plate is attached to the battery cell.

In general, a reinforcement plate is formed of metal, and an additional adhesive sheet or adhesive tape is necessary to attach the reinforcement plate to a battery cell. Thus, work efficiency and reliability are reduced.

SUMMARY OF CERTAIN INVENTIVE ASPECTS

Aspects of the present invention provide a battery pack including a reinforcement plate that is configured by a metal layer and a heat sealing layer and attached to a battery cell to reinforce the battery cell, thus improving reliability regarding product quality.

Aspects of the present invention provide a battery pack including: a battery cell; a circuit module electrically connected to the battery cell; a top cover installed on an upper portion of the battery cell; and a reinforcement plate attached to the battery cell.

According to another aspect of the present invention, the reinforcement plate may include a metal layer and a heat sealing layer. The metal layer may be formed of at least one of steel, stainless steel, and aluminum. The heat sealing layer may be formed of at least one of thermoplastic resin and thermosetting resin. The heat sealing layer may be formed of at least one of polyethylene, polypropylene, and polycarbonate. A material of the heat sealing layer may be identical to a material of the top cover.

According to another aspect of the present invention, the heat sealing layer may include a space part having a trench shape. The space part may be formed in a lattice. The space part may be filled with adhesive. The space part may be filled with metal.

According to another aspect of the present invention, the reinforcement plate may further include an adhesive layer between the metal layer and the heat sealing layer.

According to another aspect of the present invention, the battery cell may be a pouch type battery cell. The battery cell may include an external member, and the reinforcement plate may be greater in strength than the external member.

According to another aspect of the present invention, a label may be attached to the reinforcement plate. The reinforcement plate may be coupled to the top cover through heat welding.

According to another aspect of the present invention, the battery cell may include: a couple of long side portions facing each other; and a couple of short side portions connected to the long side portions and facing each other, and the reinforcement plate may be attached to the couple of long side portions of the battery cell. The reinforcement plate may be attached to the long side portion and the short side portion so as to surround the battery cell.

According to another aspect of the present invention, the top cover may include a coupling part coupled to an external device, and the reinforcement plate may have a recess in a portion corresponding to the coupling part.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF CERTAIN INVENTIVE EMBODIMENTS

Figure 1:
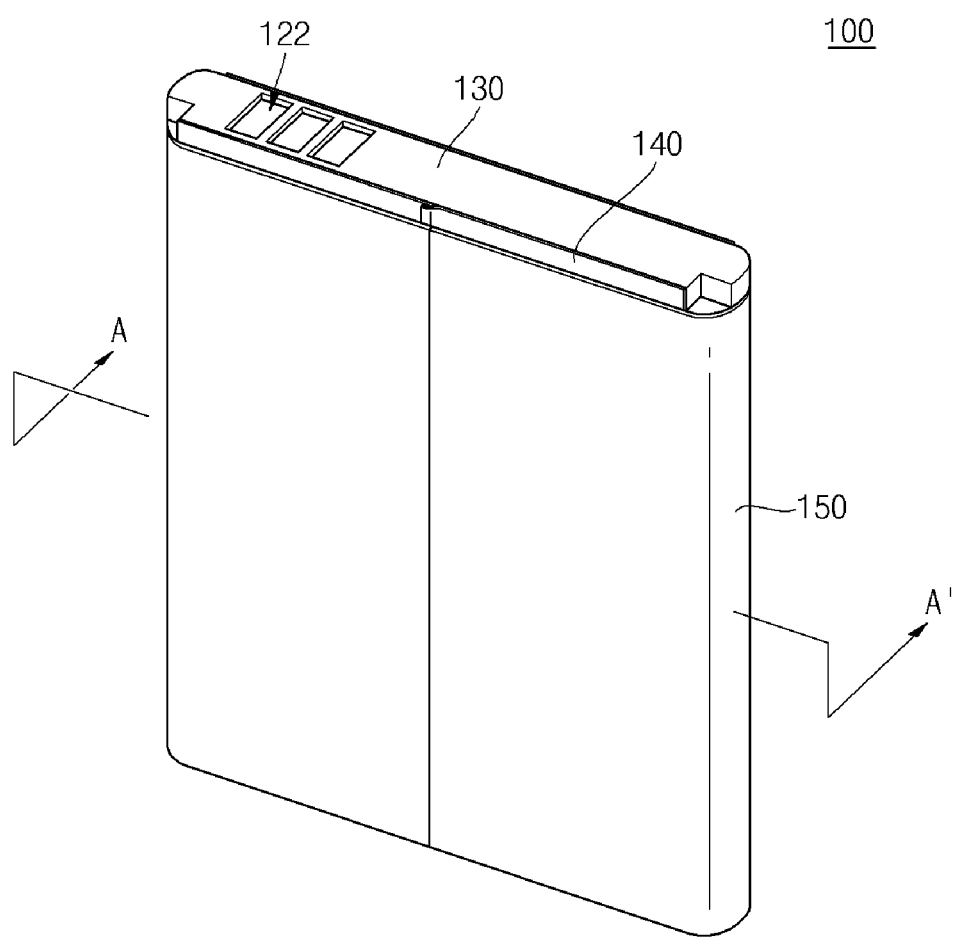
FIG. 1 is a perspective view illustrating a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, it is to be understood that where it is stated that one film, layer or element is "disposed on" or "disposed between" a second element, layer or film, the first element, layer or film may be disposed directly on the second element, layer or film or there may be intervening elements, layers or films between the first element, layer or film and the second element, layer or film. Further, as used herein, the terms "disposed between" and "disposed on" are used with the same meaning as "located on" or "located between" and is not meant to be limiting regarding any particular fabrication process.

Hereinafter, embodiments will be described in detail with reference to the accompanying drawings.

Figure 2:
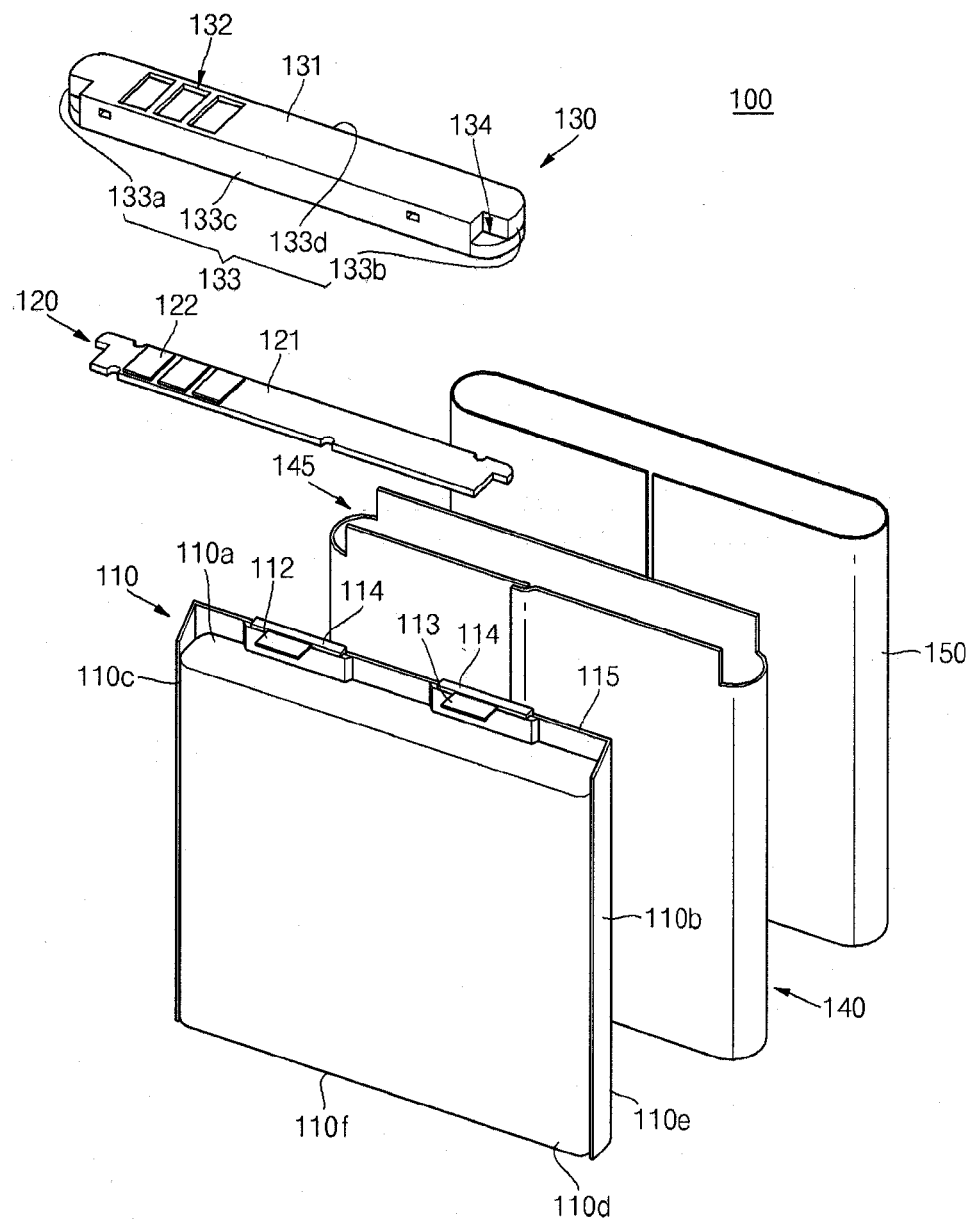
FIG. 2 is an exploded perspective view illustrating the battery pack of FIG. 1.
Figure 3:
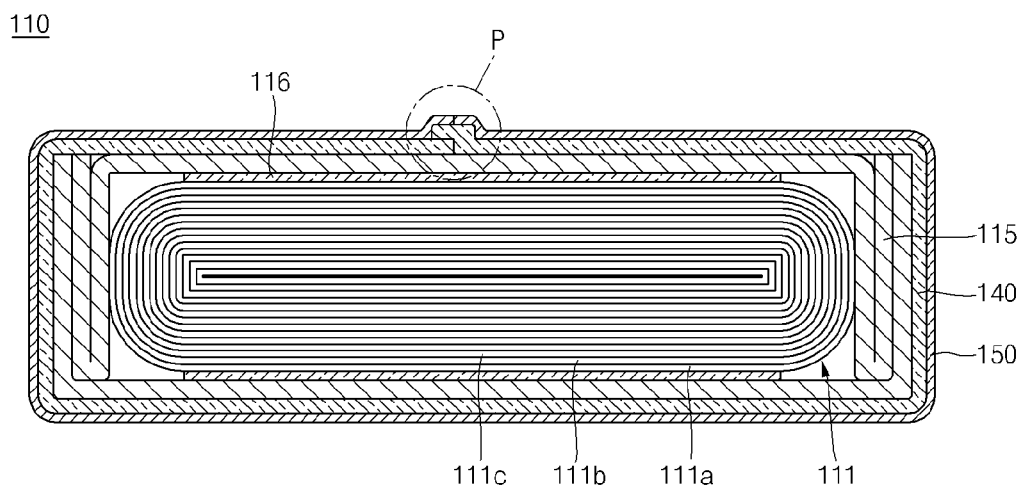
FIG. 3 is a cross-sectional view taken along line A-A' of FIG. 1.
Figure 4A:
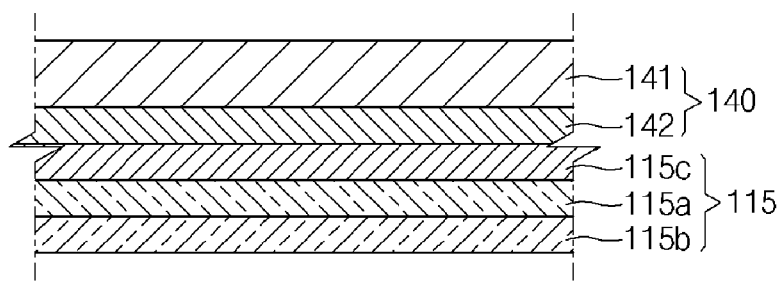
FIGS. 4A and 4B are enlarged views illustrating an external member and a reinforcement plate illustrated in FIG. 3.
Figure 4B:
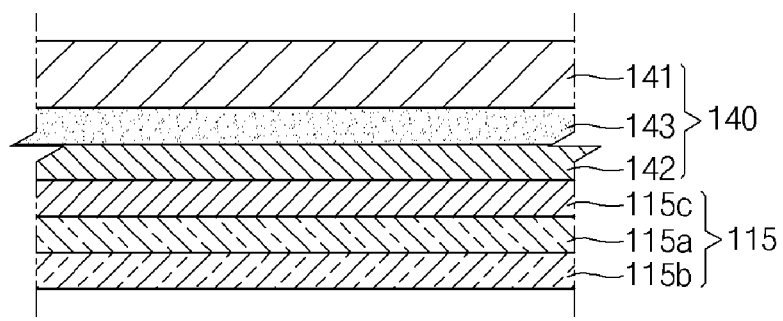
Figure 5A:
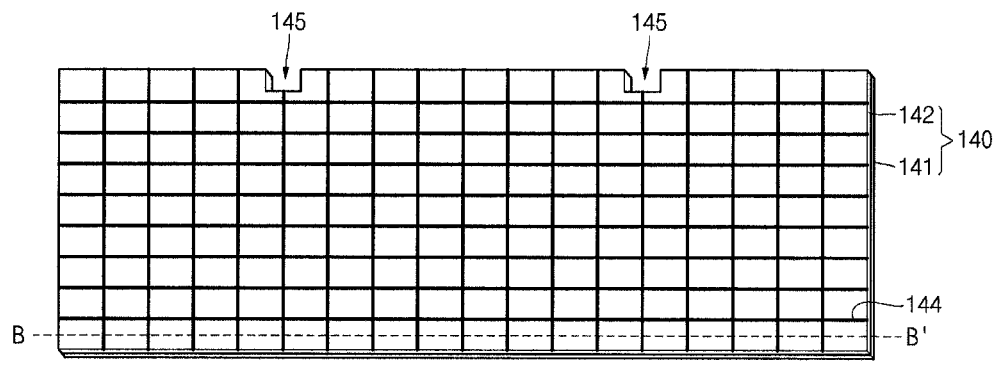
FIG. 5A is a perspective view illustrating the reinforcement plate illustrated in FIG. 1 before being coupled to a battery cell.
Figure 5B:
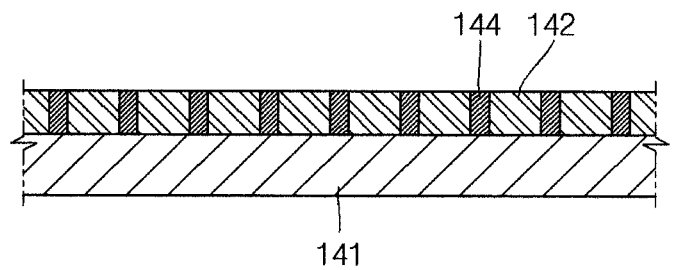
FIG. 5B is a cross-sectional view taken along line B-B' of FIG. 5A.

FIG. 1 is a perspective view illustrating a battery pack 100 according to an embodiment of the present invention. FIG. 2 is an exploded perspective view illustrating the battery pack 100 of FIG. 1. FIG. 3 is a cross-sectional view taken along line A-A' of FIG. 1. FIGS. 4A and 4B are enlarged views illustrating an external member 115 and a reinforcement plate 140 illustrated in FIG. 3. FIG. 5A is a perspective view illustrating the reinforcement plate 140 illustrated in FIG. 1 before being coupled to a battery cell 110. FIG. 5B is a cross-sectional view taken along line B-B' of FIG. 5A.

Referring to FIGS. 1 through 5B, a battery pack 100 may include a battery cell 110, a circuit module 120, a top cover 130, a reinforcement plate 140, and a label 150.

The battery cell 110, which supplies electrical energy, is classified into a can type battery cell and a pouch type battery cell according to the material of a case surrounding an electrode assembly. In the current embodiment, a pouch type battery cell is exemplified as the battery cell 110. However, aspects of the present invention are not limited thereto, and other types of battery cells may be used.

The battery cell 110 may include an electrode assembly 111 including a positive electrode 111a, a negative electrode 111c, and a separator 111b disposed between the positive electrode 111a and the negative electrode 111c, electrode tabs 112 and 113 connected respectively to the positive electrode 111a and the negative electrode 111c, and an external member 115 accommodating the electrode assembly 111 so that the electrode tabs 112 and 113 are exposed. A region, corresponding to the electrode tabs 112 and 113, contacting an end of the external member 115 is provided with an insulating tape 114 to prevent a short circuit. The battery cell 110 further includes an adhesive member 116 that is disposed between the electrode assembly 111 and the external member 115 to prevent movement or shaking of the electrode assembly 111 in the external member 115.

As illustrated in FIG. 2, the battery cell 110 includes an upper portion 110a over which the circuit module 120 is disposed, a couple of short side portions 110b and 110c connected to the upper portion 110a, a couple of long side portions 110d and 110e connected to the short side portions 110b and 110c, and a lower portion 110f facing the upper portion 110a and connected to the side portions 110b, 110c, 110d, and 110e. The short side portions 110b and 110c are shorter in width than the long side portions 110d and.

The external member 115 may have a pouch shape to accommodate and seal the electrode assembly 111. Referring to FIGS. 4A and 4B, the external member 115 includes an aluminum layer 115a, a first insulating layer 115b disposed on an inner surface of the aluminum layer 115a, and a second insulating layer 115c disposed on an outer surface of the aluminum layer 115a. The aluminum layer 115a prevents the ingress of water into the electrode assembly 111.

The first insulating layer 115b constitutes an inner surface of the external member 115 and is coupled to the electrode assembly 111 through the adhesive member 116. The first insulating layer 115b is formed of cast polypropylene (CPP) or an equivalent thereof that is not reacted with a material such as an electrolyte. However, aspects of the present invention are not limited thereto, and the first insulating layer 115b may be formed of other similar materials.

The second insulating layer 115c is coupled to the reinforcement plate 140. The second insulating layer 115c is formed of nylon, polyethylene terephthalate (PET), or an equivalent thereof to reduce mechanical and chemical damages of an external electronic device. However, aspects of the present invention are not limited thereto and the second insulating layer 115c may be formed of other similar materials.

The battery cell 110 configured as described above is electrically connected to the circuit module 120 through the electrode tabs 112 and 113. The circuit module 120 is disposed at the upper portion 110a of the battery cell 110, and electrically connected to the battery cell 110, so as to control charge/discharge of the battery cell 110. The circuit module 120 may include a circuit board 121 and an external terminal part 122.

The circuit board 121, which is formed of a plate formed of resin, includes a circuit (not shown) that controls charge/discharge of the battery cell 110, and/or a protective circuit (not shown) that prevents overcharge/overdischarge. The circuit board 121 may include a circuit device (not shown) on its lower surface. The circuit device is used to constitute a charge/discharge circuit and a protective circuit.

The external terminal part 122 is installed on the upper surface of the circuit board 121 and electrically connects the circuit board 121 to an external electronic device (not shown). The circuit board 121 further includes connection terminals (not shown) and a positive temperature coefficient (PTC) device (not shown). The connection terminals are installed on the lower surface of the circuit board 121 and are electrically connected to the electrode tabs 112 and 113 of the battery cell 110 through welding. However, aspects of the present invention are not limited thereto and the circuit board 121 may not include the connection terminal and the positive temperature coefficient (PTC) device and other methods to connect the electrode tabs 112 and 113 may be used. The PTC device is electrically connected to one of the connection terminals to shut off a current flow when the temperature of the battery pack 100 is more than a set temperature resulting from heat due to an overcurrent or overvoltage, thus preventing explosion of the battery pack 100 due to heat.

The top cover 130 is coupled to the upper portion 110a of the battery cell 110, and accommodates the circuit module 120. The top cover 130 may include a cover plate 131 and a side wall 133 extending from the cover plate 131 to the circuit module 120. The top cover 130 is formed of polyethylene (PE), polypropylene (PP), polycarbonate (PC), or an equivalent thereof. However, aspects of the present invention are not limited thereto.

The cover plate 131 is similar in shape to the circuit board 121. The inner surface of the cover plate 131 contacts the upper surface of the circuit board 121. The cover plate 131 has through holes 132 disposed in a region corresponding to the external terminal part 122. The through holes 132 expose the external terminal part 122 to the outside, so as to electrically connect the battery pack 100 to an external electronic device.

The side wall 133 includes ends 133a and 133b disposed at both ends along the longitudinal direction of the top cover 130, and connection parts 133c and 133d connecting the ends 133a and 133b to each other. The ends 133a and 133b and the connection parts 133c and 133d are covered by the reinforcement plate 140 that will be described later. The ends 133a and 133b are provided with coupling parts 134 to be coupled to an external electronic device. The external electronic device is provided with protrusions coupled to the coupling parts 134. The coupling parts 134 have different shapes from each other so as to couple the battery pack 100 in a desired direction to an external electronic device. However, aspects of the present invention are not limited thereto and the coupling parts 134 may have the same shapes.

The reinforcement plate 140 is coupled to the top cover 130 and the external member 115 of the battery cell 110 to reinforce the external member 115, which is susceptible to external force. The reinforcement plate 140 has an approximately rectangular plate shape and is attached to the long side portions 110d and 110e and the short side portions 110b and 110c of the battery cell 110 to surround the battery cell 110. The reinforcement plate 140 is also attached to portions of the ends 133a and 133b of the top cover 130 and the connection parts 133c and 133d. The reinforcement plate 140 improves a coupling force between the battery cell 110 and the top cover 130, thus reinforcing the battery pack 100. The long side portions 110d and 110e have portions P where portions of the reinforcement plate 140 overlap each other. The portions P are coupled to each other through heat welding. However, aspects of the present invention are not limited thereto and other methods of coupling the portions P to each other may be used.

The reinforcement plate 140 has recesses 145 in portions corresponding to the coupling parts so as to expose the coupling parts 134 to the outside. Thus, the battery pack 100 can be coupled to an external electronic device. A reinforcement plate without the recesses 145 has a vertical length decreased by the depth of the recesses 145 to surround a battery cell. In this case, the reinforcement plate is partially attached to connection parts of a top cover. However, in the current embodiment, the vertical length of the reinforcement plate 140 is extended to be equal to that of the battery pack 100, and the recesses 145 are disposed in the portions corresponding to the top cover 130, so that the reinforcement plate 140 is attached entirely to the connection parts 133c and 133d of the top cover 130. Thus, the reinforcement plate 140 improves the coupling force between the battery cell 110 and the top cover 130.

A structure of the reinforcement plate 140 will now be described in detail with reference to FIGS. 4A, 4B, 5A and 5B. Referring to FIG. 4A, the reinforcement plate 140 may include a metal layer 141 and a heat sealing layer 142. Referring to FIG. 4B, the reinforcement plate 140 may further include an adhesive layer 143 between the metal layer 141 and the heat sealing layer 142.

The metal layer 141, contacting an external electronic device, protects the battery cell 110 from the external electronic device and reinforces the battery cell 110. The metal layer 141 is thicker and greater in strength than the aluminum layer 115a of the external member 115, so as to reinforce the battery cell 110. The metal layer 141 may have a thickness ranging from about 100 μm to about 500 μm. If the metal layer 141 is too thin, it is difficult to protect the battery pack 100. If the metal layer 141 is too thick, it is difficult for the metal layer 141 to surround the battery cell 110. The metal layer 141 is formed of steel, stainless steel, aluminum, or an equivalent thereof. However, aspects of the present invention are not limited thereto and metal layer 141 may be formed of other similar materials.

The heat sealing layer 142 contacts the second insulating layer 115c of the external member 115, and the side wall 133 of the top cover 130. The heat sealing layer 142 is formed of thermoplastic resin that softens when heated, or a thermosetting resin. In more detail, the heat sealing layer 142 is formed of any one of polyethylene, polypropylene, polycarbonate. However, aspects of the present invention are not limited thereto and the heat sealing layer 142 may be formed of a similar thermoplastic or thermosetting resin. The heat sealing layer 142 is solid in normal state and melted at a temperature ranging from about 110° C. to about 170° C. Thus, when the external member 115 is surrounded with the reinforcement plate 140, and heated, the heat sealing layer 142 is melted so as to attach the reinforcement plate 140 to the external member 115. The reinforcement plate 140 is attached to the external member 115 through the heat sealing layer 142.

In general, an additional adhesive sheet or adhesive tape is necessary to attach a reinforcement plate formed just of metal to a battery cell. However, in the current embodiment, the reinforcement plate 140, including the metal layer 141, further includes the heat sealing layer 142.

The heat sealing layer 142 is also attached to the side wall 133 of the top cover 130, so as to prevent removal of the top cover 130 from the battery cell 110. That is, the heat sealing layer 142 is coupled to the external member 115 and the top cover 130 through heat welding to reinforce the battery cell 110. The sealing layer 142 is identical in material to the top cover 130 such that the top cover 130 is firmly coupled to the heat sealing layer 142 with a small adhesive area through heat welding.

Referring to FIGS. 5A and 5B, the heat sealing layer 142 includes a space part 144 having a trench shape. The space part 144 is formed in a lattice and is filled with adhesive that is formed of thermosetting adhesive. The space part 144 improves a bonding force of the heat sealing layer 142 attached to the external member 115. That is, the reinforcement plate 140, including the space part 144, provided with the adhesive improves coupling force between the battery cell 110 and the top cover 130, thus reinforcing the battery pack 100.

The space part 144 is filled with metal that is formed of aluminum or copper, which have high heat conductivity. However, aspects of the present invention are not limited thereto, and the space part 144 may be filled with other metals that have high heat conductivity. The metal may rapidly transfer heat generated from the battery cell 110 to the metal layer 141. That is, the reinforcement plate 140, including the space part 144 provided with the metal, functions as a heat dissipation plate to rapidly dissipate heat generated from the battery cell 110.

The adhesive layer 143 is disposed between the metal layer 141 and the heat sealing layer 142 to improve bonding force of the metal layer 141 and the heat sealing layer 142. The adhesive layer 143 is formed of polyester-urethane based material or polyether-urethane based material. However, aspects of the present invention are not limited thereto and the adhesive layer 143 may be formed of other similar materials.

The label 150 is attached to the reinforcement plate 140 in the manner of surrounding the reinforcement plate 140. The label 150 covers the rest except for the portion of the reinforcement plate 140 attached to the connection parts 133c and 133d of the top cover 130. The label 150 improves the coupling force between the battery cell 110, the top cover 130, and the reinforcement plate 140.

As described above, the reinforcement plate 140, including the heat sealing layer 142 formed of thermoplastic resin, is attached to the long side portions 110d and 110e and the short side portions 110b and 110c, and the connection parts 133c and 133d and the ends 133a and 133b, so as to improve the coupling force between the battery cell 110, the top cover 130, and the reinforcement plate 140 and to reinforce the battery pack 100. Thus, the battery pack 100 improves reliability regarding product quality.

Hereinafter, a battery pack 200 according to another embodiment will now be described. The battery pack 200 is the same in configuration and function as the battery pack 100 of the previous embodiment, except for the position of reinforcement plates 240. Thus, the battery pack 200 will be described with respect to the reinforcement plates 240.

Figure 6:
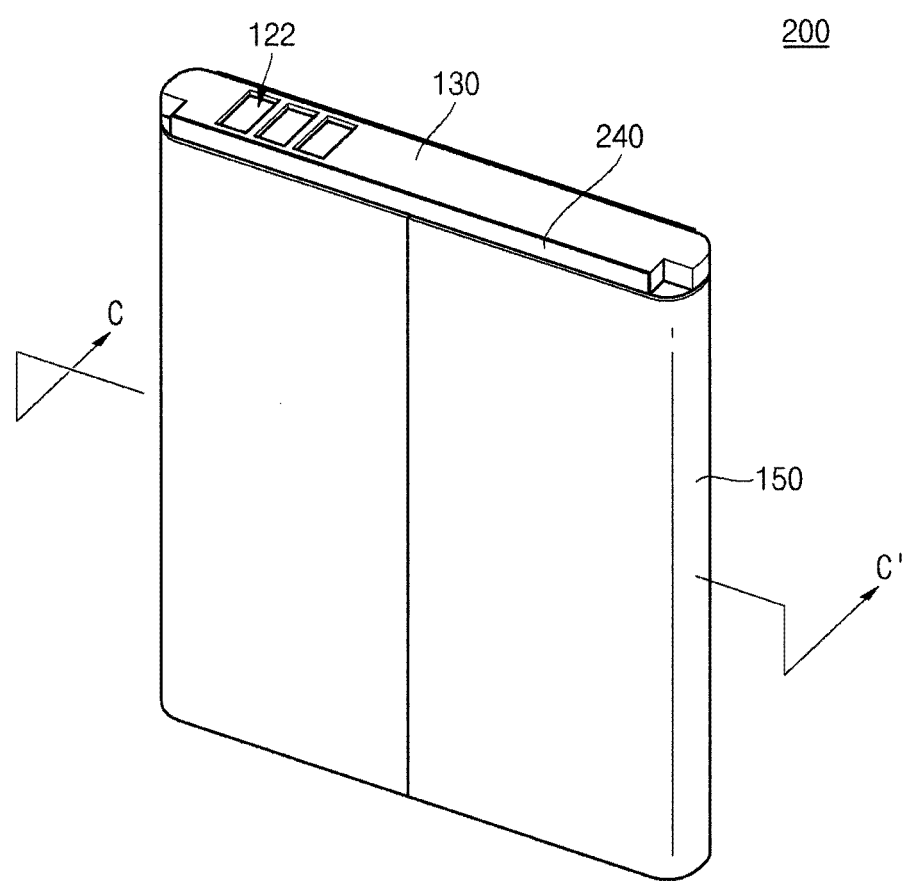
FIG. 6 is a perspective view illustrating a battery pack according to another embodiment of the present invention.
Figure 7:
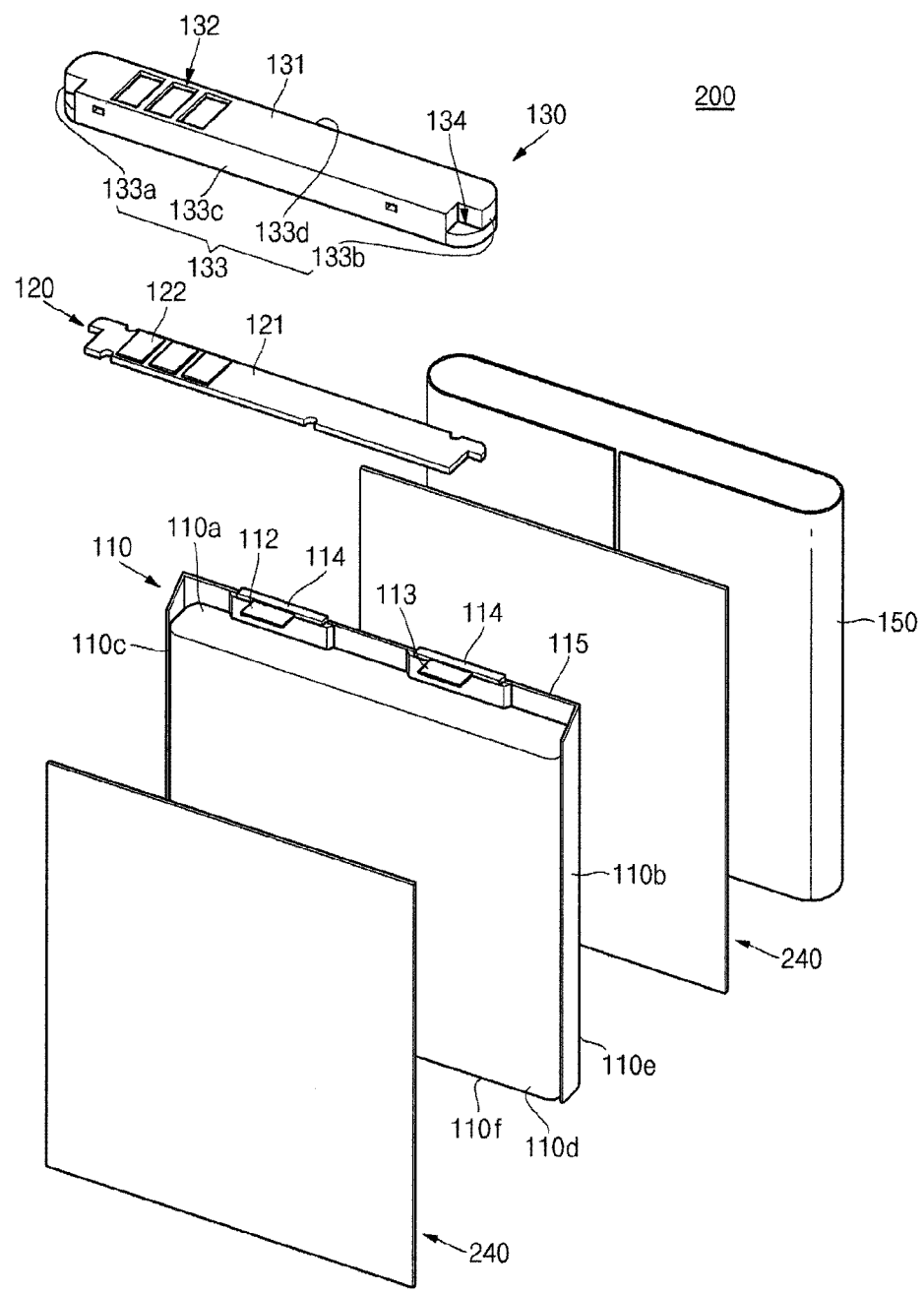
FIG. 7 is an exploded perspective view illustrating the battery pack of FIG. 6.
Figure 8:
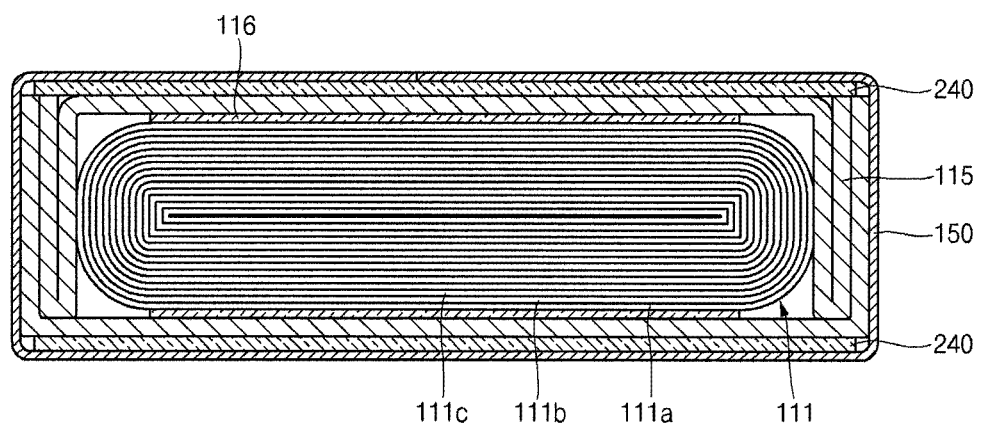
FIG. 8 is a cross-sectional view taken along line C-C' of FIG. 6.
Figure 9A:
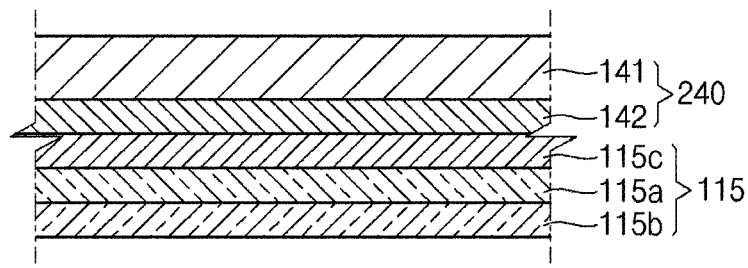
FIGS. 9A and 9B are enlarged views illustrating an external member and a reinforcement plate illustrated in FIG. 8.
Figure 9B:
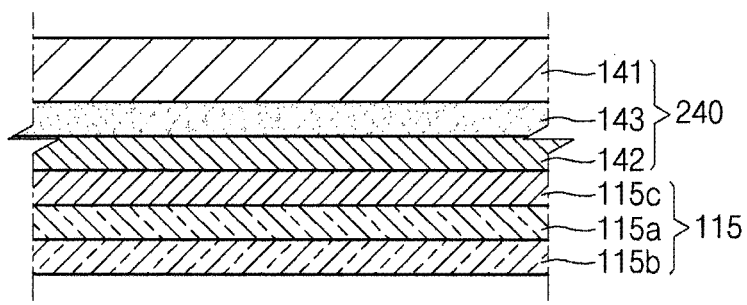

FIG. 6 is a perspective view illustrating a battery pack according to another embodiment. FIG. 7 is an exploded perspective view illustrating the battery pack of FIG. 6. FIG. 8 is a cross-sectional view taken along line C-C' of FIG. 6. FIGS. 9A and 9B are enlarged views illustrating an external member and a reinforcement plate illustrated in FIG. 8. Referring to FIGS. 6 through 9B, the battery pack 200 may include a battery cell 110, a circuit module 120, a top cover 130, the reinforcement plates 240, and a label 150.

The reinforcement plates 240 are attached to the top cover 130 and an external member 115 of the battery cell 110 to reinforce the external member 115 susceptible to external force. The reinforcement plates 240 have approximately rectangular plate shapes and are attached to a couple of long side portions 110d and 210e of the battery cell 210. The reinforcement plates 240 are attached to the long side portions 110d and 110e, respectively. Since the long side portions 110d and 110e of the battery cell 110 have even greater areas than short side portions 110b and 110c of the battery cell 110, the reinforcement plates 240 are attached only to the long side portions 110d and 110e to reinforce the battery cell 110. Although not shown, after the reinforcement plates 240 are attached to the long side portions 110d and 110e of the battery cell 110, a molding process is performed on the short side portions 110b and 110c of the battery cell 110, so that the battery pack 200 is neat in appearance.

The reinforcement plates 240 are also attached to connection parts 133c and 133d of the top cover 130. The reinforcement plates 240 improve the coupling force between the battery cell 110 and the top cover 130, thus reinforcing the battery pack 200.

The reinforcement plates 240 including a heat sealing layer 142 formed of thermoplastic resin are attached to the long side portions 110d and 110e and the connection part 133c and 133d of the top cover 130, so as to improve the coupling force between the battery cell 110, the top cover 130, and the reinforcement plates 240 and to reinforce the battery pack 200. Thus, the battery pack 200 can improve reliability regarding product quality.

As described above, in the battery pack according to aspects of the present invention, the reinforcement plate including the heat sealing layer formed of thermoplastic resin is attached to the battery cell and the top cover, so as to improve the coupling force between the battery cell, the top cover, and the reinforcement plate. Thus, aspects of the present invention improve reliability regarding product quality of the battery pack and reinforce the battery pack.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
    a battery cell;
    a circuit module comprising a printed circuit board electrically connected to the battery cell;
    a non-metallic top cover separate from and covering the circuit module and the printed circuit board installed on an upper portion of the battery cell; and
    a reinforcement plate attached to the battery cell
    wherein the reinforcement plate comprises portions that overlap each other and a heat sealing layer and a metal layer comprising at least one of steel and stainless steel, wherein the heat sealing layer makes contact with the battery cell and the metal layer is outwardly exposed.

2. The battery pack as claimed in claim 1, wherein the heat sealing layer is formed of at least one of thermoplastic resin and thermosetting resin.

3. The battery pack as claimed in claim 1, wherein the heat sealing layer is formed of at least one of polyethylene, polypropylene, and polycarbonate.

4. The battery pack as claimed in claim 1, wherein a material of the heat sealing layer is identical to a material of the top cover.

5. The battery pack as claimed is claim 1, wherein the heat sealing layer comprises a space part having a trench shape.

6. The battery pack as claimed in claim 5, wherein the space part is formed in a lattice.

7. The battery pack as claimed in claim 5, wherein the space part is filled with adhesive.

8. The battery pack as claimed in claim 5, wherein the space part is filled with metal.

9. The battery pack as claimed in claim 1, wherein the reinforcement plate further comprises an adhesive layer between the metal layer and the heat sealing layer.

10. The battery pack as claimed in claim 1, wherein the battery cell is a pouch type battery cell.

11. The battery pack as claimed in claim 1, further comprising a label attached to the reinforcement plate.

12. The battery pack as claimed in claim 1, wherein the reinforcement plate is coupled to the top cover through heat welding.

13. A battery pack comprising:
    a battery cell;
    a circuit module comprising a printed circuit board electrically connected to the battery cell;
    a non-metallic top cover separate from and covering the circuit module and the printed circuit board installed on an upper portion of the battery cell;
    a first reinforcement plate and a second reinforcement plate attached to the battery cell; and
    wherein the battery cell comprises a couple of long side portions facing each other; and
    a couple of short side portions connected to the long side portions and facing each other, and
    wherein the first reinforcement plate is attached to one of the long side portions of the battery cell and the second reinforcement plate is attached to another one of the long side portions of the battery cell
    wherein the reinforcement plates comprise portions that overlap each other and a heat sealing layer and a metal layer comprising at least one of steel and stainless steel, wherein the heat sealing layer makes contact with the battery cell and the metal layer is outwardly exposed.

14. The battery pack as claimed in claim 13, wherein the reinforcement plate is attached to the long sides portion and the short side portions so as to surround the battery cell.

15. The battery pack as claimed in claim 1, wherein the top cover comprises a coupling part coupled to an external device, and
    wherein the reinforcement plate has a recess in a portion corresponding to the coupling part.

16. The battery pack as claimed in claim 13, wherein:
    the first reinforcement plate is attached to one of the couple of long side portions; and
    the second reinforcement plate is attached to another one of the couple of long side portions,
    wherein the first reinforcement plate and the second reinforcement plate are disposed so as to face each other and the battery cell is interposed between the first reinforcement plate and the second reinforcement plate wherein the reinforcement plates comprise a heat sealing layer and a metal layer comprising at least one of steel and stainless steel.

17. A reinforcement plate of a battery pack having a battery cell, a circuit module comprising a printed circuit board electrically connected to the battery cell, a non-metallic top cover separate from and covering the circuit module and the printed circuit board installed on an upper portion of the battery cell, and a label surrounding the battery cell, the reinforcement plate comprising:
   portions that overlap each other;
   a metal layer comprising at least one of steel and stainless steel; and
   a heat sealing layer disposed on the metal layer,
   wherein the heat sealing layer makes contact with the battery cell and the metal layer is outwardly exposed.

* * * * *